United States Patent [19]

Grosseau

[11] 4,031,977
[45] June 28, 1977

[54] TRANSMISSION DEVICES FOR MOTOR VEHICLES
[75] Inventor: Albert Grosseau, Chaville, France
[73] Assignee: Societe Anonyme Automobiles Citroen, France
[22] Filed: Jan. 8, 1976
[21] Appl. No.: 647,605
[30] Foreign Application Priority Data
    Jan. 14, 1975   France ............................. 75.00999
[52] U.S. Cl. .......................... 180/77 R; 74/473 R; 74/475; 180/82 A; 188/31; 192/4 A
[51] Int. Cl.² .................................................. B60T 1/06
[58] Field of Search ............ 180/70 R, 77 R, 82 A; 192/4 A, 4 C; 74/473 R, 475, 503, 850, 424; 188/69, 31

[56] References Cited
UNITED STATES PATENTS

| | | | |
|---|---|---|---|
| 2,653,689 | 9/1953 | Hasbany | 192/4 A |
| 2,860,522 | 11/1958 | Howlett | 74/473 |
| 3,043,403 | 7/1962 | Kelley | 188/69 |
| 3,241,640 | 3/1966 | McCordic | 192/4 A |
| 3,361,234 | 1/1968 | Runyon | 192/4 A |
| 3,519,111 | 7/1970 | Baldwin | 192/4 A |
| 3,601,231 | 8/1971 | Kolacz | 188/69 |
| 3,703,941 | 11/1972 | Ohie | 188/31 |

Primary Examiner—Joseph F. Peters, Jr.
Assistant Examiner—Terrance L. Siemens
Attorney, Agent, or Firm—Weingarten, Maxham & Schurgin

[57] ABSTRACT

A transmission device for a vehicle comprises a common linearly movable selector rod for selecting the drive mode of the transmission and for actuating a parking brake. The driving mode is determined by a rack formed on the rod and engageable with a pinion, and the parking brake is actuated by means of a lever controlled by a cam carried by the rod.

13 Claims, 9 Drawing Figures

TRANSMISSION DEVICES FOR MOTOR VEHICLES

BACKGROUND OF THE INVENTION

1. Field of the Invention.

The present invention relates to transmission devices for motor vehicles.

2. Description of the Prior Art.

There have been proposed transmission devices for vehicles comprising an automatic gearbox or the like, combined with a parking brake, such that control of the gearbox and the brake are effected by a single control element. The control element acts through a series of levers which form a complex linkage composed of a large number of parts and which may, in turn, act via servo control means. The overall system is therefore relatively complex and expensive to produce.

SUMMARY OF THE INVENTION

According to the invention, there is provided in a transmission device for a motor vehicle means for providing a reverse drive condition of the transmission device, means for immobilizing the vehicle when the vehicle is stationary, first actuating means for actuating the reverse drive means, second actuating means for actuating the immobilizing means, and means for controlling the first and second actuating means, the control means comprising a manually actuated, slidable, selector rod, a rack, and first stop means, the rack and first stop means being movable with the selector rod, the first actuating means comprising a pinion arranged to engage the rack, and the second actuating means comprising a cam and second stop means connected to the cam, the cam being movable in at least one direction by the rod during a part of its displacement, by cooperation between the first and second stop means.

BRIEF DESCRIPTION OF THE DRAWINGS

Embodiments of the invention will now be described, by way of example, with reference to the accompanying diagrammatic drawings, in which.

DESCRIPTION OF THE PREFERRED EMBODIMENTS

Figure 1:
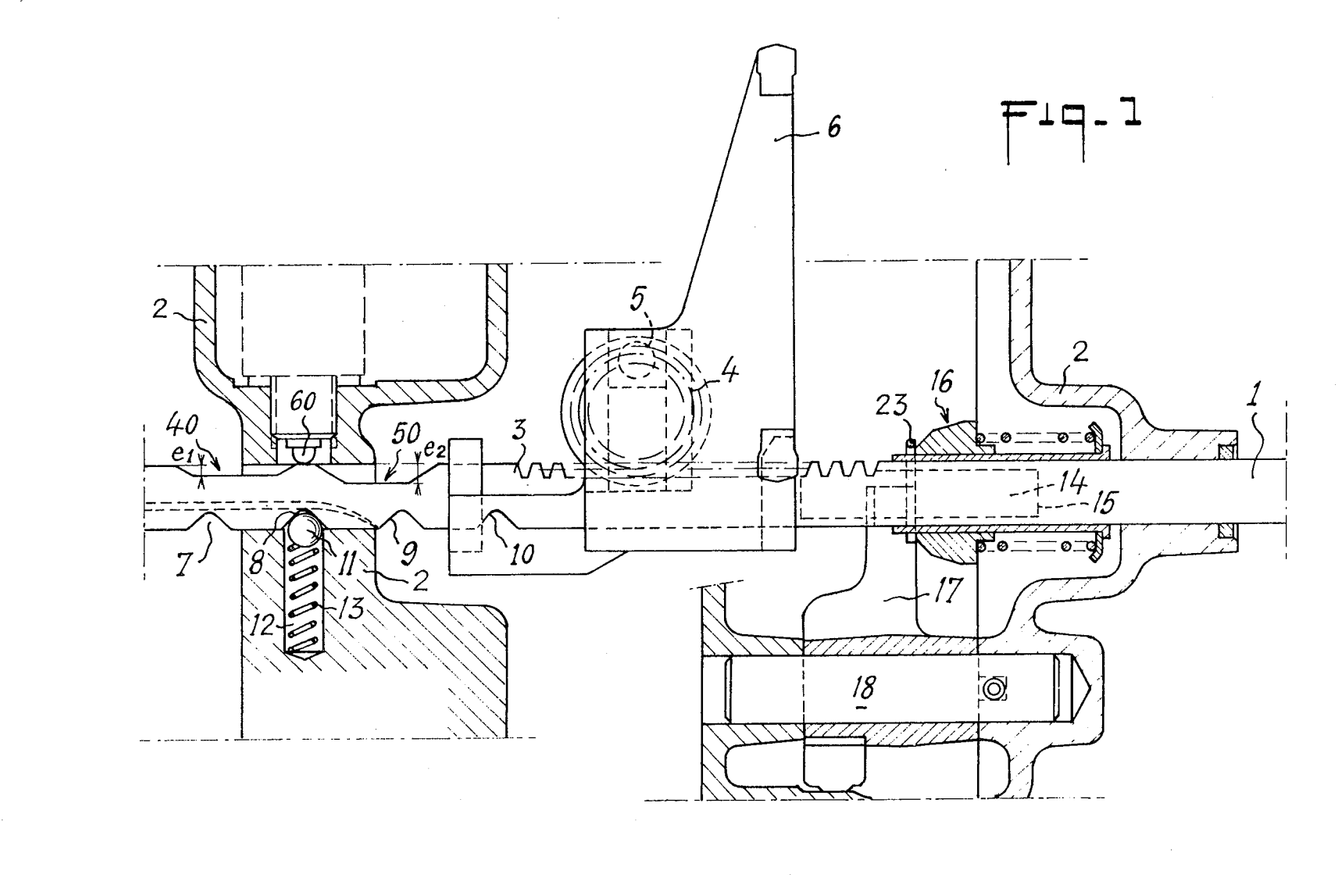
FIG. 1 a fragmentary longitudinal section of a transmission device in accordance with the invention.

There is shown in FIG. 1 a transmission device, for example a friction speed variator or automatic or other gearbox, for a motor vehicle. The transmission device comprises a selector rod 1 mounted in a casing 2. Over a part of its length, the rod 1 carries a rack 3 which cooperates with the teeth of a pinion 4 which rotates on a spindle (not shown) rigid with the casing 2. The pinion 4 has a control stud 5 arranged to slide in a groove incorporated for this purpose in the shank of a selector fork 6 associated with a sliding gear whereby axial displacement of the rod 1 causes axial displacement of the selector fork 6 and the sliding gear. The rod 1 has four primary notches 7, 8, 9 and 10 which can be selectively aligned with a detent ball 11 retained within a seat 12 of the casing 2 and biased outwardly by means of a spring 13. The detent ball 11 engages in the appropriate notch in the rod 1 to lock the rod in a selected axial position. The adjacent notches 7 to 10 are separated from each other by a distance equal to the displacement of the rod 1 required to rotate the pinion 4 through 90°. When the ball 11 is in alignment with the notch 7, the stud 5 carried by the pinion 4 will be in a position trailing by 90°, in a clockwise direction, with respect to the position at which it appears in FIG. 1. Similarly, when the notch 9 is in alignment with the ball 11, the stud 5 will be in the position diametrically opposed to that referred to above and, finally, when the notch 10 is in alignment with the ball 11, the stud 5 will be in a position diametrically opposed to that illustrated in FIG. 1, and the fork 6 will therefore be in the same axial position as that shown in FIG. 1. The fork 6 which is entrained, by the stud 5, for displacement along an axis parallel to the rod 1, may thus assume three positions depending on which notch is situated in alignment with the ball 11, — a first position situated at the left of that illustrated and defined by alignment of the notch 7 with the ball 11 (let it be assumed that this position produces forward drive of the vehicle), a second position situated at the right of that illustrated and defined by alignment of the notch 9 with the ball 11 (thus produces reverse drive) and, finally, a third position as illustrated and defined by an alignment of the notch 8 with the ball 11 and also alignment of the notch 10 with the ball 11, this third position corresponding to the "neutral" condition of the transmission device.

It will be seen that the rod 1, has a flat face 14 terminating at a right-hand end 15 which forms a stop surface. Abreast of the flat face 14, the rod 1 slidingly carries means 16 for actuating a parking brake or other immobilizing device of the vehicle. The actuating means 16 is arranged to cooperate with a lever 17 pivotal about a spindle 18 mounted on the casing 2.

The rod 1 is provided with secondary notches 40 and 50 having elongate flat inner surfaces and which cooperate with sensor means in the form of an electric contact element 60 carried by the casing 2. These secondary notches cooperate with the contact element when the rod 1 is in a position corresponding to the selection of forward or reverse drive. The notch 40 is situated in alignment with the contact element when forward travel of the vehicle is selected. Its depth $e_1$ is less than that $e_2$ of the notch 50 which is in alignment with the contact element when reverse is selected. These notches 40 and 50 are thus situated substantially in correspondence with the notches 7 and 9. On the other hand, the rod 1 does not have any secondary notches corresponding to the notch 8 or the notch 10 which corresponds to the neutral condition of the transmission device.

Figure 2:
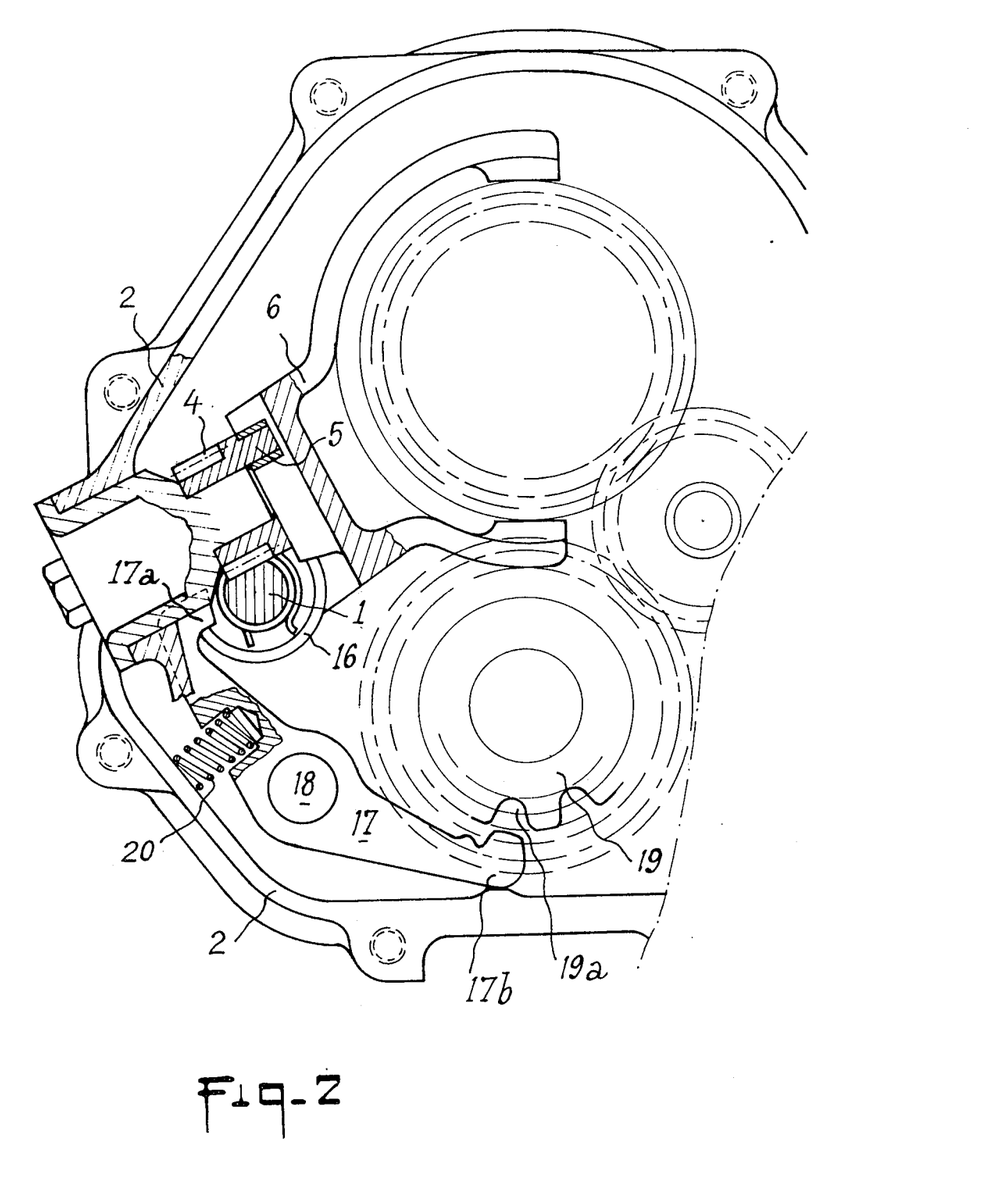
FIG. 2 is a transverse cross-section of the device shown in FIG. 1.

As shown in FIG. 2, one end 17a of the lever 17 lies adjacent to the rod 1 and may be in contact with the actuating means 16 whereas its other end 17b is arranged to cooperate with a toothed wheel 19 rigid with the output shaft of the transmission device. The lever 17 is continuously biased by a spring 20 in a sense to resist engagement of its end 17b with the wheel 19 and to hold the end 17b in contact with the casing 2 for example.

Figure 3:
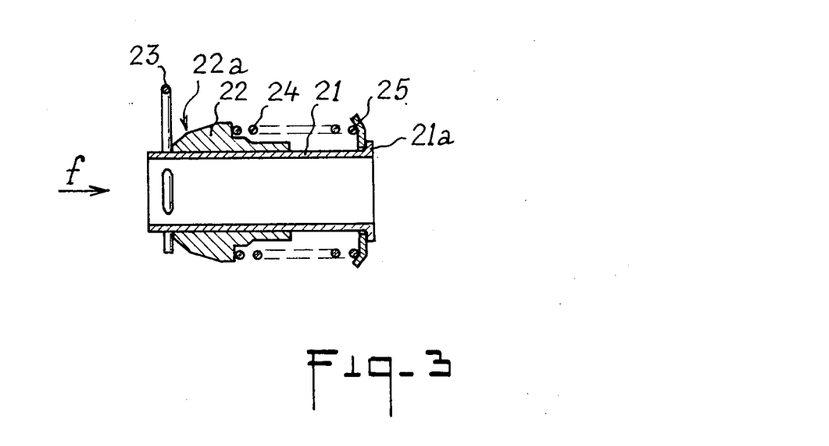
FIGS. 3 and 4 are sections showing details of FIG. 1.
Figure 4:
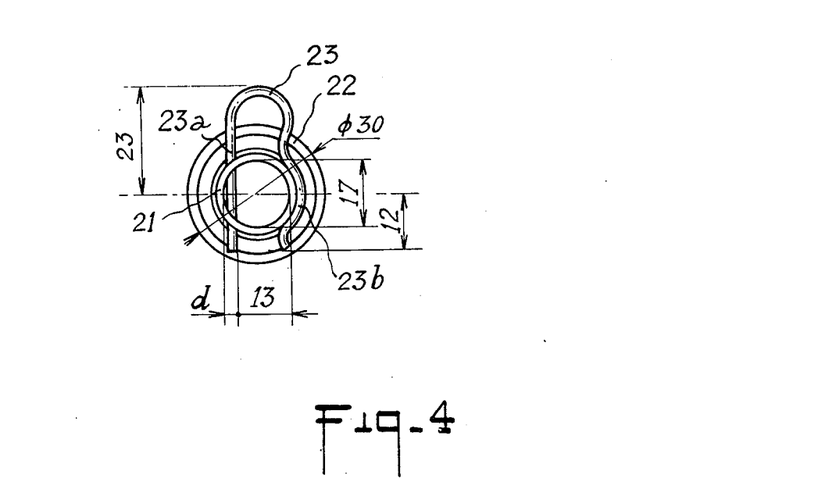

FIGS. 3 and 4 show the actuating means 16 in detail. It will be apparent from FIG. 3 that the actuating means 16 comprises a tubular member or sleeve 21, an end 21a of which is formed as a shoulder. The sleeve 21 is arranged to slide on the rod 1, and the sleeve 21 itself slidably supports an annular cam 22 having an annular surface 22a profiled to contact the end 17a of the lever 17. The cam 22 is held in contact with a stop in the form of a pin 23 carried by the sleeve 21, by means of a compression spring 24 extending between the rear surface of the cam 22 and a dished bearing washer 25 abutting the end 21a of the sleeve 21. It will be seen from FIG. 4 (which is a view looking in the direction of arrow $f$ in FIG. 3) that the pin 23 is in the form of a bifurcated clip. One of the limbs 23a of the pin 23 passes through the sleeve 21 in an eccentric manner whereas its limb 23b is formed in such manner as to clamp the sleeve 21 externally. The distance $d$ shown in FIG. 4 corresponds to the depth of the flat surface 14 of the rod 1 (FIG. 1).

Figures 5, 6:
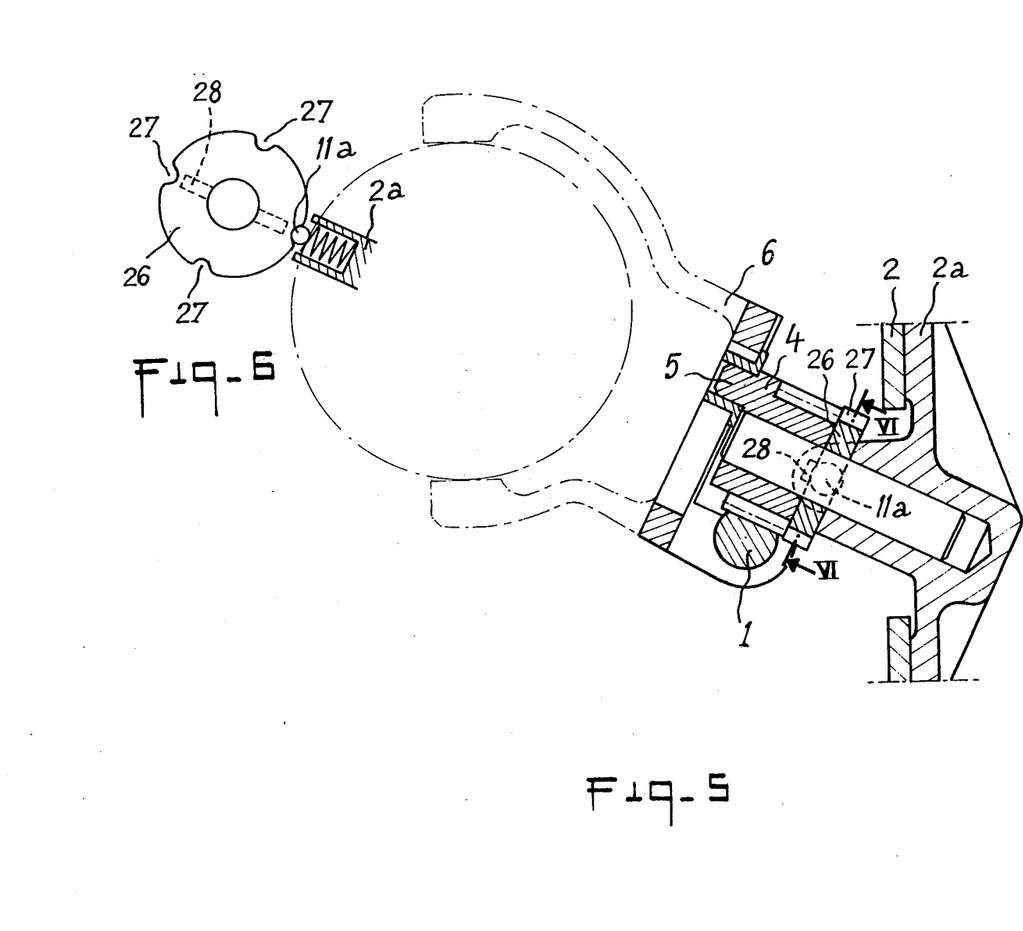
FIG. 5 is a fragmentary transverse cross-section of a first modified form of the transmission device.
FIG. 6 is a section taken on line VI—VI of FIG. 5.

FIG. 5, shows a modified arrangement for locking of the selector rod. In this arrangement, the detent ball (designated 11a) does not directly engage the rod, but engages a disc 26 provided with notches 27 spaced at 90° intervals around the disc 26. The disc 26 is coupled for rotation with the pinion 4 by means of a peg 28 engaging in a corresponding groove in the pinion 4. The detent ball 11a is situated in a tubular seat incorporated in the casing 2 abreast of the disc 26 or (as shown), in a cover 2a carrying the spindle of the pinion 4 and secured to the casing 2.

FIG. 6, clearly shows the manner in which the ball 11a cooperates with the notches 27 of the disc 26.

Figures 7, 8:
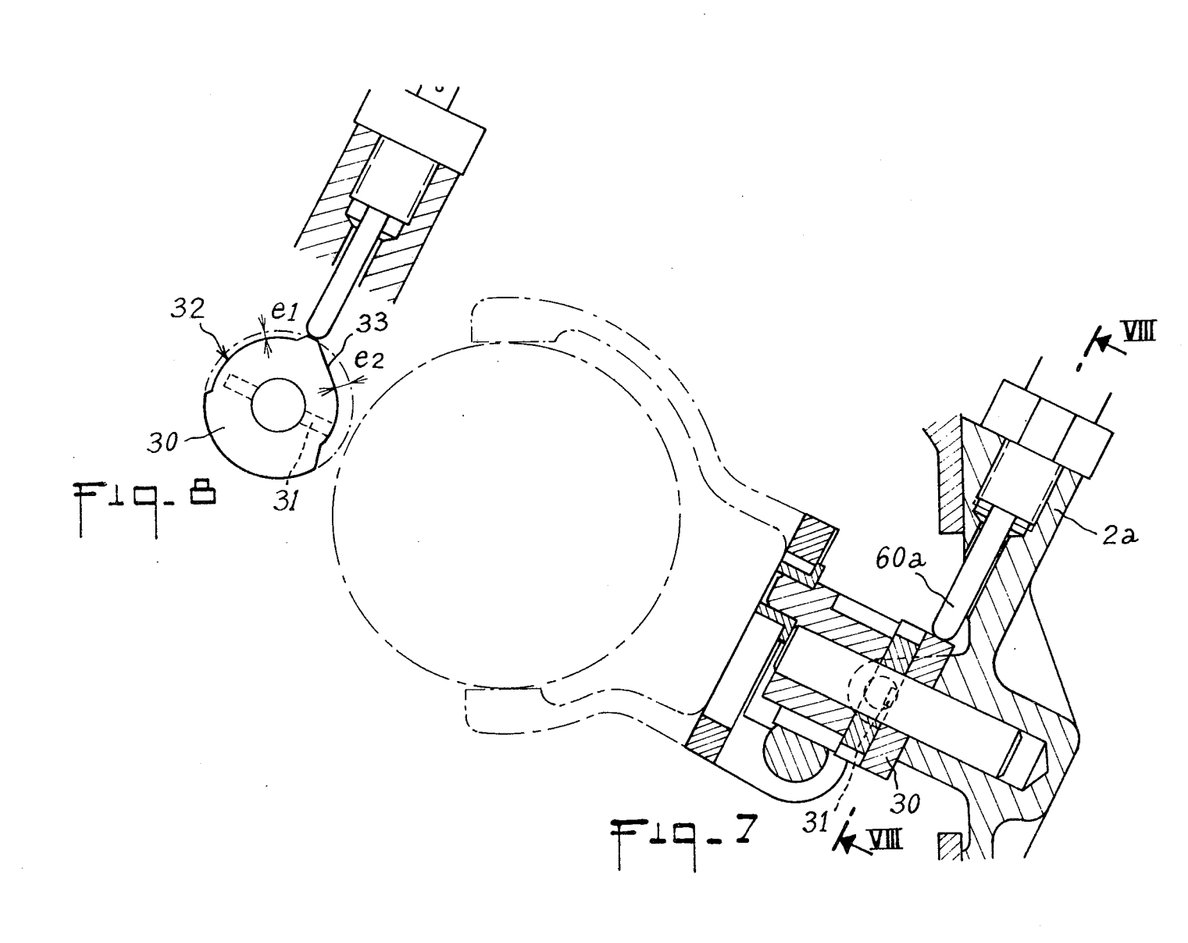
FIG. 7 is a fragmentary transverse cross-section of a second modified form of the transmission device.
FIG. 8 is a section taken on line VIII–VIII of FIG. 7.

FIGS. 7 and 8, which are views similar to those of FIGS. 5 and 6, illustrate another modified arrangement. In this arrangement a secondary disc 30 is coupled for rotation with the disc 26 and thus with the pinion 4, by means of a peg 31. The disc 30 is provided with notches 32 and 33 arranged to come into alignment with the contact element previously described with reference to FIG. 1, but in this case, carried by the cover 2a, the contact element being designated 60a in FIGS. 7 and 8. Thus, the point of actuation of the contact element is not situated at the level of the selector rod 1 as shown in FIG. 1, but at the level of the secondary disc 30. Thus, to provide the same function as the notches 40 and 50 of FIG. 1, the notch 32 has a smaller depth than the notch 33. One or other of the notches 32, 33 is in alignment with the contact element 60a provided the position of the disc 30 does not correspond to the placing of the transmission device in the neutral condition. It will be noted that the notches 40 and 50 (FIG. 1) and the notches 32 and 33 (FIGS. 7 and 8) are of such a length that the functions of the contact element 60 or 60a are retained throughout the range of gear engagements and disengagements of the forward and reverse drives.

The operation of the transmission device will now be described. Beginning with FIG. 1 in which the device is illustrated in its neutral condition, if the selector rod 1 is moved towards the right, the fork 6 is moved towards the left by rotation of the pinion 4 on the rack 3, which results in selecting a forward gear of the device. At this instant, the notch 7 is in alignment with the ball 11 and the electric contact element 60 is engaged in the notch 40. The signal which the element 60 transmits in response to this condition may, for example, act to prevent starting of the engine while the gear is engaged, by breaking the starter control circuit. If the rod 1 is moved from its neutral position towards the left, the fork 6 displaced towards the right which has the result of selecting reverse gear. The notch 9 is then in alignment with the ball 11 and the contact device 60 is engaged in the notch 50. In this condition, this contact device also transmits a signal which acts to prevent starting of the engine, and an additional signal which may, for example, control the actuation of reversing lights of the vehicle, by closing a supply circuit for these lights. The additional signal provided by the notch 50 is rendered possible by the fact that the depth $e_2$ of this notch is greater than the depth $e_1$ of the notch 40.

Upon further movement of the rod 1 towards the left, the fork 6 is moved back into its neutral position, in this case, the stud 5 of the pinion 4 being in a diametrically opposed position to that illustrated in FIG. 1, the notch 10 being in alignment with the ball 11, and the contact element 60 being in a condition analogous to that of FIG. 1, in which the element 60 is not engaged in a notch in the rod 1; in this condition the contact element 60 does not transmit a signal to prohibit starting the engine.

The actuating means 16 remains in an inoperative state provided that the rod 1 is not displaced towards the left beyond the point at which the notch 9 is aligned with the ball 11. The rod 1 slides freely in the sleeve 21 which is free to reciprocate over a short distance between the casing 2 and the end 17a of the lever 17. On the other hand, if the rod 1 is moved towards the left beyond the position at which the notch 9 is aligned with the ball 11, the end 15 of the flat face 14 comes into contact with the limb 23a of the pin 23. The rod 1 then entrains the sleeve 21 in its displacement towards the left. This displacement is transmitted to the cam 22 via the spring 24. At this instant, either the end 17b of the lever 17 will be in precise alignment with one of the inter-tooth spaces 19a of the wheel 19, or it will not be in alignment with one of these spaces; in the first case, the surface profile 22a of the cam 22 as the cam 22 moves towards the left, causes the lever 17 to pivot about the spindle 18 into an intertooth space 19a, the lever 17 offering only very slight resistance to displacement of the cam 22 — in the second case, the teeth of the wheel 19 will prevent pivotal movement of the lever 17 and leftwards displacement of the cam 22. In this latter case, the cam 22 remains in engagement with the end 17a of the lever 17 and the leftwards displacement of the sleeve 21 compresses the spring 24. The cam 22 is then in a "standby" condition, and any subsequent slight movement of the vehicle will result in aligning an inter-tooth space 19a of the wheel 19 with the end 17b of the lever 17 whereby the end 17b will engage in the intertooth space under the loading of the spring 24 which is then able to thrust the cam towards the left. As will be apparent, when the end 17b of the lever 17 is engaged in one of the inter-tooth spaces of the wheel 19, the wheel 19 will be locked and thus the transmission device will be locked thereby causing the driven wheels of the vehicle to be braked. If the rod 1 is now moved towards the right, contact between the limb 23a of the pin 23 and the end 15 of the flat face 14 of the rod 1, is eliminated. Under the action of the spring 20, the lever 17 is pivoted into its unlocked position and displaces the cam 22 and thus the actuating means 16 as a whole, towards the left. In order this unlocking action may occur with certainty, the surface 22a of the cam 2 should have such an inclination as to allow, without difficulty, movement of the cam 22 with respect to the lever 17 in either direction. In particular, this surface should be of sufficient axial length so that the lever never bears on a cylindrical part of the cam 22.

In the modified arrangements of FIGS. 5 to 8, the primary and secondary discs 26 and 30 rotate in synchronism with the pinion 4, and the manner in which the notches in these discs cooperate with the ball 11a and the contact element 60a in the consecutive positions of the selector rod 1, occur in a similar manner to that described in relation to FIGS. 1 to 4.

The transmission device described permits means for controlling reversing to be combined in a simple manner with a parking brake. This results in a compact arrangement reducing the control system to a single rod, which, advantageously, reduces the cost of its production and adjustment. Moreover, the selector rod merely has a reversible linear displacement, and this displacement can easily be effected by the driver of the vehicle. Further, the arrangement described precludes the application of the parking brake when a gear is engaged and permits complementary indicator devices or safety features to be readily incorporated into the transmission device.

The transmission device is particularly suitable for use in automobiles.

Figure 9:
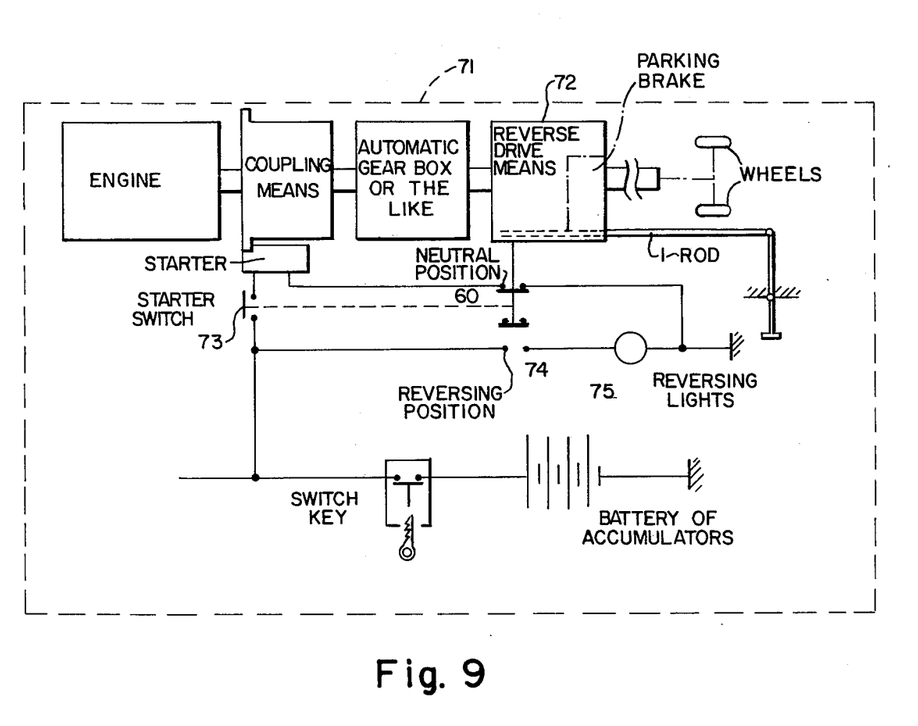
FIG. 9 is a schematic diagram showing the various controls of the automobile with which this transmission is used.

The schematic diagram of FIG. 9 shows the various control elements and their relationship to the mechanisms shown and described in the previous figures. Motor vehicle 71 is shown generally by the dotted line surrounding the elements of FIG. 9. Reverse drive means 72 is that portion of the transmission which is actuated by fork 6 when the transmission rod is moved to the reverse position. Starter switch 73 is controlled by contact element 60 so that when this element resides in either notch 40 or notch 50 of rod 1, the starter switch is disengaged. Additionally, reversing position switch 74 is engaged when contact element 60 resides in notch 50 thereby also actuating the reversing lights 75.

What is claimed is:

1. In a transmission device for a motor vehicle, means for providing a reverse drive condition of the transmission device, means for immobilizing the vehicle when the vehicle is stationary, first actuating means for actuating the reverse drive means, second actuating means for actuating the immobilizing means, and means for controlling the first and second actuating means, the control means comprising a manually actuated, slidable, selector rod, a rack, and first stop means, the rack and first stop means being movable with the selector rod, the first actuating means comprising a pinion arranged to engage the rack, and the second actuating means comprising a cam and second stop means connected to the cam, the cam being movable in at least one direction by the rod during a part of its displacement, by cooperation between the first and second stop means.

2. A transmission device according to claim 1, further comprising a casing which houses the reverse drive means, the immobilizing means, and the first and second actuating means, and wherein the immobilizing means comprises a toothed output gear wheel, a lever having opposed end portions, and means mounting the lever for pivotal movement relative to the casing, one of said end portions being engageable with the teeth of the gear wheel, and the other of said end portions being engageable with the cam, the arrangement being such that when the cam is moved by the rod, the engagement between the cam and the said other end portion of the lever forces the said one end portion of the lever into locking engagement with the teeth of the gear wheel.

3. A transmission device according to claim 2, further comprising spring means pivotally biasing the lever in a sense to oppose the action of the cam.

4. A transmission device according to claim 1, wherein the cam is coaxial with the rod, said second actuating means further comprising spring means connecting the second stop means with the cam.

5. A transmission device according to claim 4, wherein the rod has a flat surface portion terminating in an abutment surface which defines the first stop means, and the second actuating means comprises a sleeve slidable on the rod, said sleeve having opposed end portions, one of said end portions defining a shoulder, and a pin carried by the other of said end portions, said pin defining said second stop means, the cam being slidable axially along the sleeve, and the spring means being interposed between the cam and the shoulder to bias the cam against the pin.

6. A transmission device according to claim 1, further comprising means defining four axially spaced first notches in the rod, adjacent said notches being spaced by a distance equal to the axial displacement of the rod required to rotate the pinion through 90°, and resiliently biased detent means carried by the casing and engageable with a selected notch whereby to releasably lock the rod in a selected one of four positions.

7. A transmission device according to claim 1, further comprising disc means rotatable with the pinion, said disc means having four notches spaced at angles of 90° around the circumference of the disc means, and resiliently biased detent means carried by the casing and engageable with a selected notch to releasably lock the pinion in a selected one of four positions.

8. A transmission device according to claim 6, further comprising means defining two axially spaced second notches in the rod, and sensor means arranged to cooperate with the second notches, the arrangement being such that the sensor means engages in a respective one of the second notches when the rod is in an axial position such that the transmission device is in a driving condition.

9. A transmission device according to claim 8, wherein, when the sensor means engages in either one of said second notches, the sensor means is operative to prevent starting of the engine of the vehicle.

10. A transmission device according to claim 9, wherein the sensor means engages in one of the second notches when the transmission device is in a forward driving condition, and the sensor means engages in the other of the second notches when the transmission device is in a reverse driving condition, the two said second notches being of different depths such that when the sensor means engages in the said other notch, the sensor means is additionally operative to actuate reversing lights of the vehicle.

11. A transmission device according to claim 7, further comprising second disc means rotatable with the pinion, said second disc means having two circumferentially spaced notches, and sensor means arranged to cooperate with the notches of the second disc means, the arrangement being such that the sensor means engages in a respective one of the said two notches when the selector rod is in an axial position such that the transmission device is in a driving condition.

12. A transmission device according to claim 11, wherein, when the sensor means engages in either one of the said two notches, the sensor means is operative to prevent starting of the engine of the vehicle.

13. A transmission device according to claim 12, wherein the sensor means engages in one of the two said notches when the transmission device is in a forward driving condition, and the sensor means engages in the other of the two said notches when the transmission device is in reverse driving condition, the two said notches being of different depths such that when the sensor means engages in the said other notch, the sensor means is additionally operative to actuate reversing lights of the vehicle.

* * * * *